United States Patent
Edwards (10) Patent No.: US 7,418,269 B2
(45) Date of Patent: Aug. 26, 2008

(54) UPLINK INTERFERENCE REDUCTION IN WIRELESS COMMUNICATIONS SYSTEMS

(75) Inventor: Keith Russell Edwards, Hutton (GB)

(73) Assignee: Nortel Networks Limited, St. Laurent, Quebec (CA)

(*) Notice: Subject to any disclaimer, the term of this patent is extended or adjusted under 35 U.S.C. 154(b) by 0 days.

(21) Appl. No.: 10/563,068

(22) PCT Filed: Jun. 30, 2004

(86) PCT No.: PCT/GB2004/002817

§ 371 (c)(1), (2), (4) Date: Dec. 29, 2005

(87) PCT Pub. No.: WO2005/004522

PCT Pub. Date: Jan. 13, 2005

(65) Prior Publication Data

US 2006/0160550 A1    Jul. 20, 2006

(51) Int. Cl.
*H04B 7/00* (2006.01)
(52) U.S. Cl. .................. 455/522; 455/70; 455/436; 455/437; 370/331
(58) Field of Classification Search .......... 455/522, 455/70, 436, 437, 447, 450, 501; 370/331
See application file for complete search history.

(56) References Cited

U.S. PATENT DOCUMENTS

| | | | |
|---|---|---|---|
| 5,594,946 A | | 1/1997 | Menich |
| 5,706,282 A | * | 1/1998 | Chung ................ 370/280 |
| 6,067,446 A | * | 5/2000 | Persson et al. ........... 455/69 |
| 6,434,367 B1 | * | 8/2002 | Kumar et al. ........... 455/70 |
| 6,507,572 B1 | * | 1/2003 | Kumar et al. .......... 370/335 |
| 6,574,211 B2 | * | 6/2003 | Padovani et al. ........ 370/347 |
| 6,574,456 B2 | * | 6/2003 | Hamabe ................ 455/63.3 |
| 6,741,837 B1 | * | 5/2004 | Nakano et al. ......... 455/67.11 |
| 6,963,544 B1 | * | 11/2005 | Balachandran et al. .... 370/281 |
| 6,968,201 B1 | * | 11/2005 | Gandhi et al. ........... 455/522 |

(Continued)

FOREIGN PATENT DOCUMENTS

DE    10245121 A    4/2004

(Continued)

OTHER PUBLICATIONS

3rd Generation Research Project; Technical Specification Group Radio Access Network; Feasibility Study considering the viable deployment of UTRA in additional and diverse spectrum arrangements, Jun. 17, 2003, pp. 1-58.

*Primary Examiner*—Matthew Anderson
*Assistant Examiner*—Minh Dao
(74) *Attorney, Agent, or Firm*—Barnes & Thornburg LLP (57) ABSTRACT

A wireless communications system has a plurality of uplink and downlink channels available for use. Channels are distributed among different operators who may plan their networks in a non-ideal manner. A terminal uses an uplink channel and a downlink channel selected from those available and performs a method to check whether it is causing interference to other users of the system. The method determines whether the terminal is transmitting at a power which may cause interference to an adjacent uplink channel. If so, the terminal determines which downlink channel is associated with the adjacent uplink channel and monitors that downlink channel. The terminal may then operate in a manner which will reduce interference.

33 Claims, 9 Drawing Sheets

U.S. PATENT DOCUMENTS 6,996,083 B1 * 2/2006 Balachandran et al. ...... 370/337
2001/0011018 A1 * 8/2001 Baum et al. .................. 455/439
2002/0111163 A1 8/2002 Hambe
2004/0259558 A1 * 12/2004 Skafidas et al. ............. 455/450

FOREIGN PATENT DOCUMENTS

EP 0713300 A 5/1996

* cited by examiner

Fig.1 *(Not to Scale)*

UPLINK INTERFERENCE REDUCTION IN WIRELESS COMMUNICATIONS SYSTEMS

FIELD OF THE INVENTION

This invention relates to reducing interference in wireless communications systems.

BACKGROUND TO THE INVENTION

Figure 1:
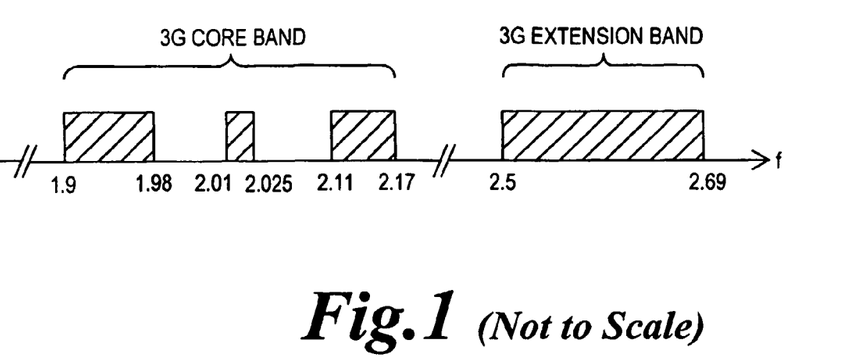
FIG. 1 shows frequency allocation to 3G wireless systems.

Third Generation (3G) wireless communications systems such as the Universal Mobile Telecommunications System (UMTS) operate within a regulated portion of the RF spectrum. FIG. 1 shows the current allocation of spectrum to 3G wireless systems. There are three separate bands of spectrum between 1900-1980 MHz, 2010-2025 MHz and 2110-2170 MHz. Together these are known as the 3G core band. Different telecoms operators are granted different parts of the spectrum within these bands for their uplink and downlink channels. Uplink and downlink channels occupy separate frequency bands and a duplex pair of uplink and downlink channels is offset by a fixed frequency of 190 MHz.

Increasing demand for services in this band has prompted manufacturers, operators and regulators to investigate the possibility of using additional spectrum outside of that originally allocated. One possibility for additional 3G spectrum which is currently being considered is the band from 2.5 to 2.69 GHz; this is being referred to as the 3G Extension Band. There are various ways in which the additional spectrum can be used. The Third Generation Partnership Project (3GPP) has proposed a range of possible scenarios for using the additional spectrum. In some of these scenarios, the extension band is wholly or primarily used for additional downlink channels to support higher bandwidth delivery to terminals.

The applicant has identified a problem which can occur when the additional spectrum is used in this way.

The present invention seeks to provide a way of minimising or overcoming this problem.

SUMMARY OF THE INVENTION

A first aspect of the present invention provides a method of operating a terminal in a wireless communications system, the system having a plurality of uplink and downlink channels available for use, the terminal being arranged to use an uplink channel and a downlink channel selected from the plurality, the method comprising:
  determining whether the terminal is transmitting at a power which may cause interference to an adjacent uplink channel;
  determining which downlink channel is associated with the adjacent uplink channel;
  monitoring that downlink channel and deciding, on the basis of the monitoring, whether there is a need to operate the terminal in a manner which will reduce interference.

This method allows a terminal to take responsibility for operating in a 'safe' manner, i.e. a manner which causes minimal interference to other users, where both uplink and downlink channels of different connections are not adjacent to one another in frequency. The method is particularly applicable to systems which allow a variable duplex spacing between uplink and downlink channels. It is also particularly applicable to systems where an extension band of channels are added to a system such that the strict uplink-downlink duplex spacing which previously existed is not maintained for all connections. The invention is also particularly applicable to situations where channels are allocated to different operators who each have independently sited base stations and thus coverage of cell sites overlap in non-ideal ways.

The method can be implemented by software stored on a memory device in the terminal which is executed by a microprocessor or similar processing device. Alternatively, it can be implemented as equivalent hardware, such as an Application Specific Integrated Circuit (ASIC) as is well known in the art.

The uplink and downlink may carry signals which are modulated according to any scheme. However, the invention is particularly applicable to systems which carry wideband signals and to systems where the modulation scheme results in the modulated signal having a non-constant envelope, i.e. a high peak-to-mean signal ratio, such as in Code Division Multiple Access (CDMA) and Wideband CDMA (W-CDMA).

While embodiments of the invention are described in the context of 3G systems, the invention is by no means restricted to these systems.

Other aspects of the invention provide a control apparatus for a terminal, a terminal incorporating the control apparatus, software for operating a terminal and a method of handling a connection between a terminal and a base station.

BRIEF DESCRIPTION OF THE DRAWINGS

Embodiments of the invention will be described with reference to the accompanying drawings in which.

DESCRIPTION OF PREFERRED EMBODIMENTS

Figure 2:
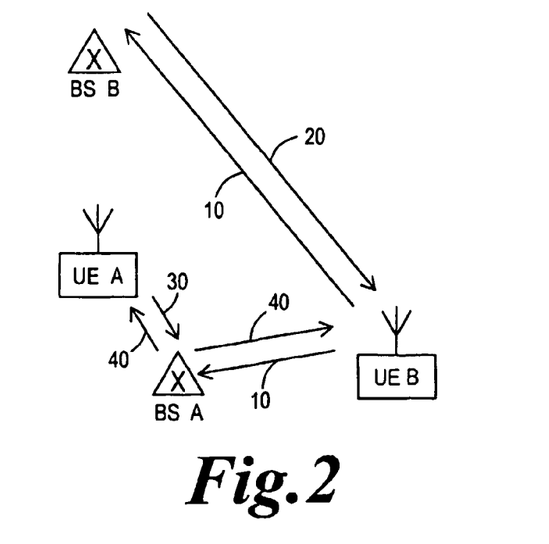
FIG. 2 shows a wireless system with two operators.
Figure 3:
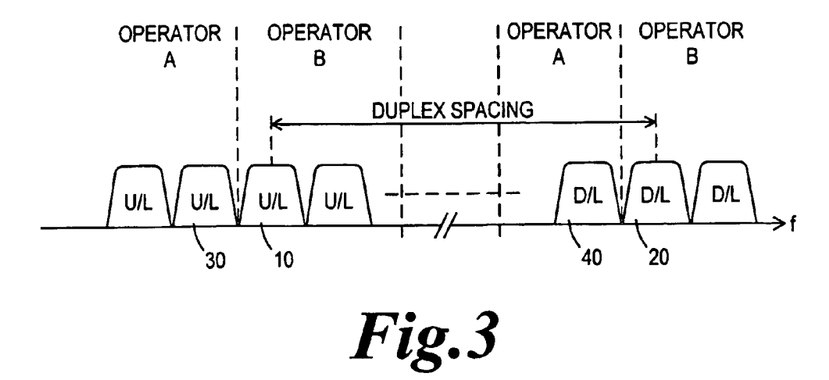
FIGS. 3 and 4 show allocation of channels in the core 3G band.

FIG. 2 shows an example wireless communications system with two operators: Operator A and Operator B. Each operator provides their own network infrastructure which includes base stations (BS A, BS B) and an associated backhaul network (not shown). Each operator is allocated a different portion of the overall 3G spectrum. A terminal (user equipment UE B) subscribes to the service provided by operator B. A downlink 20 to the terminal UE B and an uplink 10 to the base station BS B are provided by channels on different frequencies, as shown in FIG. 3. For each operator, the uplink and downlink channels are spaced by a fixed amount, known as the duplex spacing. For the 3G core band the duplex spacing is 190 MHz.

Figure 4:
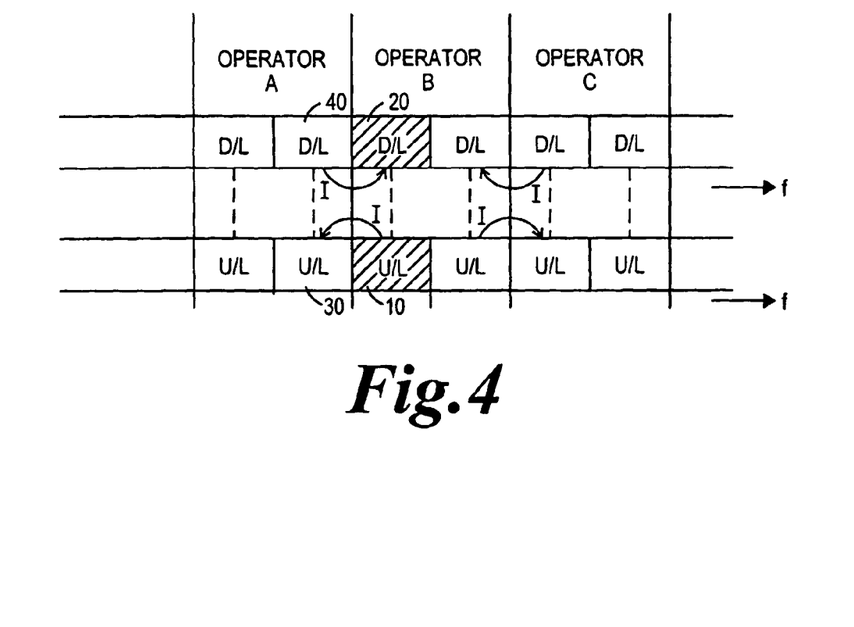

In order to obtain a better understanding of the present invention, an existing scenario will now be described in more detail with reference to FIGS. 3 and 4. As best shown in FIG. 4, uplink and downlink channels are strictly allocated in pairs (see dashed lines joining uplink and downlink pairs) with a fixed frequency duplex spacing. Operator A is allocated adjacent uplink and downlink frequency bands to Operator B, i.e. uplink channel 10 used by a terminal or user equipment UE B is adjacent an uplink channel 30 used by a terminal UE A and a downlink channel 20 used by BS B is adjacent a downlink channel 40 used by BS A. Due to the non-ideal manner in which operators independently construct their networks, terminals assigned to one operator may sometimes encounter interference from another operator. Referring again to FIG. 2, this shows a terminal UE B which is distant from it's. servicing base station BS B but close to the base station BS A of another operator, operator A. In the uplink direction, an uplink transmission 10 from terminal UE B will be received by base station BS A due to the omni directional transmission characteristics of terminal UE B. The extent to which the uplink 10 is received depends on the adjacent channel leakage ratio (ACLR) of terminal equipment, the adjacent channel selectivity (ACS) of base stations, the transmit power of terminal UE B and the proximity of terminal UE B to BS A.

In the downlink direction, terminal UE B will receive downlink transmission 20 from BS B as well as the downlink transmission 40 from BS A. The extent to which the unwanted downlink transmission 40 is received by UE B depends on the ACLR of UE B, the ACS of BS A, the transmit power of BS A and the proximity of BS A to UE B. The sources of interference are shown on FIG. 4 as I.

As terminal UE B moves further from the base station BS B, the transmit power of UE B is increased, in a known manner, to provide an acceptable quality of communication with BS B. As terminal UE B increases its transmit power, there will begin to be a deterioriation in the quality of communication on the adjacent uplink channel 30 used by operator A. As a consequence, base station BS A will perceive a problem and will increase transmit power on the adjacent downlink channel 40 to maintain an acceptable quality of communication. This situation can repeat itself, with the terminal UE B and base station BS A increasing their respective levels of transmit power. Eventually, terminal UE B will reach a maximum level of transmit power but still achieve an unsatisfactory quality of communication. When the quality of communication deteriorates sufficiently terminal UE B can request a handover to an alternative frequency channel which should improve the quality of communication. Thus, there exists an escape mechanism from this problem of interference.

Figure 5:
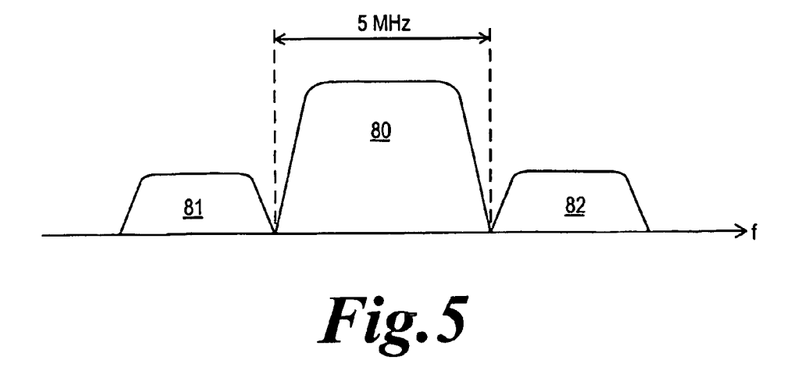
FIG. 5 shows power distribution for a transmitting terminal.

FIG. 5 shows a typical profile of power against frequency for a wideband CDMA (W-CDMA) terminal. As expected, it can be seen that the majority of the transmit power is concentrated within the allotted CDMA channel 80. However, some power is located in bands 81, 82 adjacent the allotted channel. It is these bands 81, 82 together with the non-constant envelope of the CDMA or W-CDMA modulation scheme which give rise to the interference problems outlined above. Other wireless systems such as GSM are designed with a much 'tighter' specification which cannot readily be achieved in wideband systems.

Figure 6:
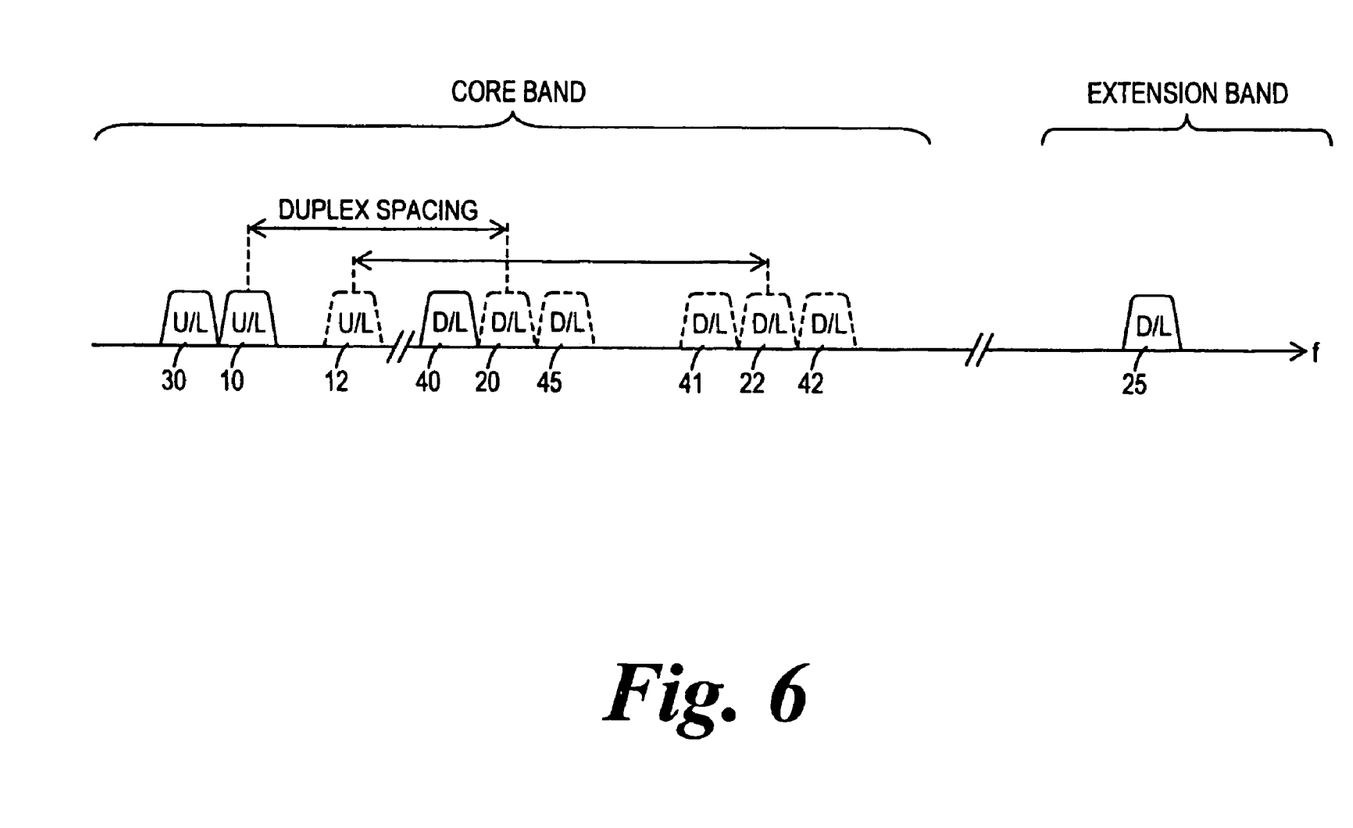
FIG. 6 shows allocation of channels in the core and extension bands.

Now, one of the proposed scenarios for use of spectrum in the extension band will be described. Part of the extension band is allocated for additional downlink channels. An example allocation is shown in FIG. 6. The uplink 10 of operator B lies in the core band, as in FIG. 3, with an uplink 30 of operator A occupying the adjacent frequency channel. The downlink 25 of operator B lies in the extension band and no longer lies adjacent to the downlink 40 of operator A. A consequence of downlink 25 of operator B not lying adjacent the downlink 40 of operator A is that the escape mechanism previously described is not available, i.e. as terminal UE B increases it's transmit power, it does not see a corresponding increase in interference from the downlink 40 of BS A, and therefore will not reach a point where it requests handover to an alternative frequency.

In accordance with the invention, terminal UE B monitors usage of channel 40, i.e. the channel which lies adjacent the position that would have been used for the downlink 20, had the downlink occupied it's usual position within the core band. In this way, the terminal UE B can determine whether the 'near-far' problem exists and can take action to alleviate the problem, even though the terminal is not actually using a downlink in the core band. Stated another way, terminal UE B monitors usage of a downlink channel which is paired with an uplink channel that is adjacent to the uplink channel currently in use by the terminal. This is important because the interference caused by a single user terminal, UE B, can affect a number of users in network A.

Figure 7:
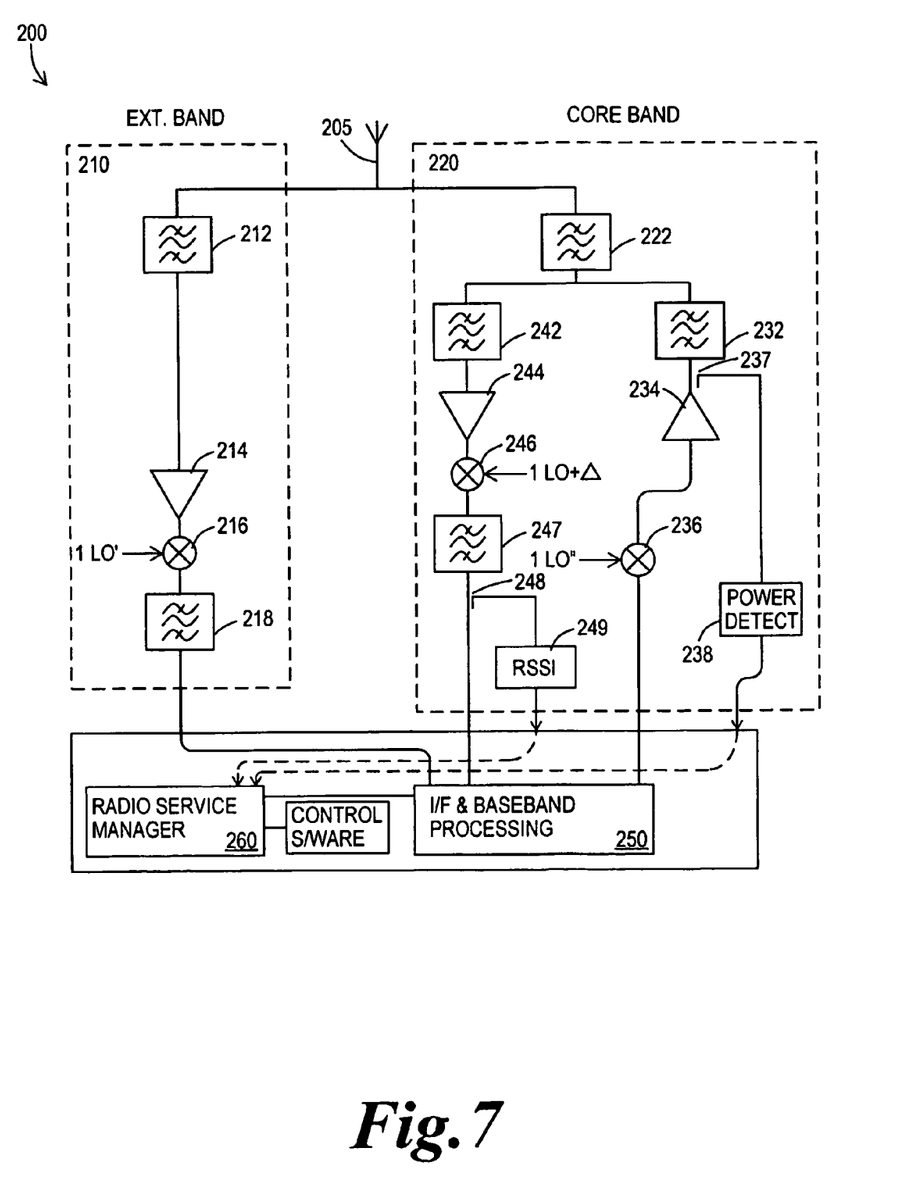
FIG. 7 shows terminal apparatus.
Figure 8A:
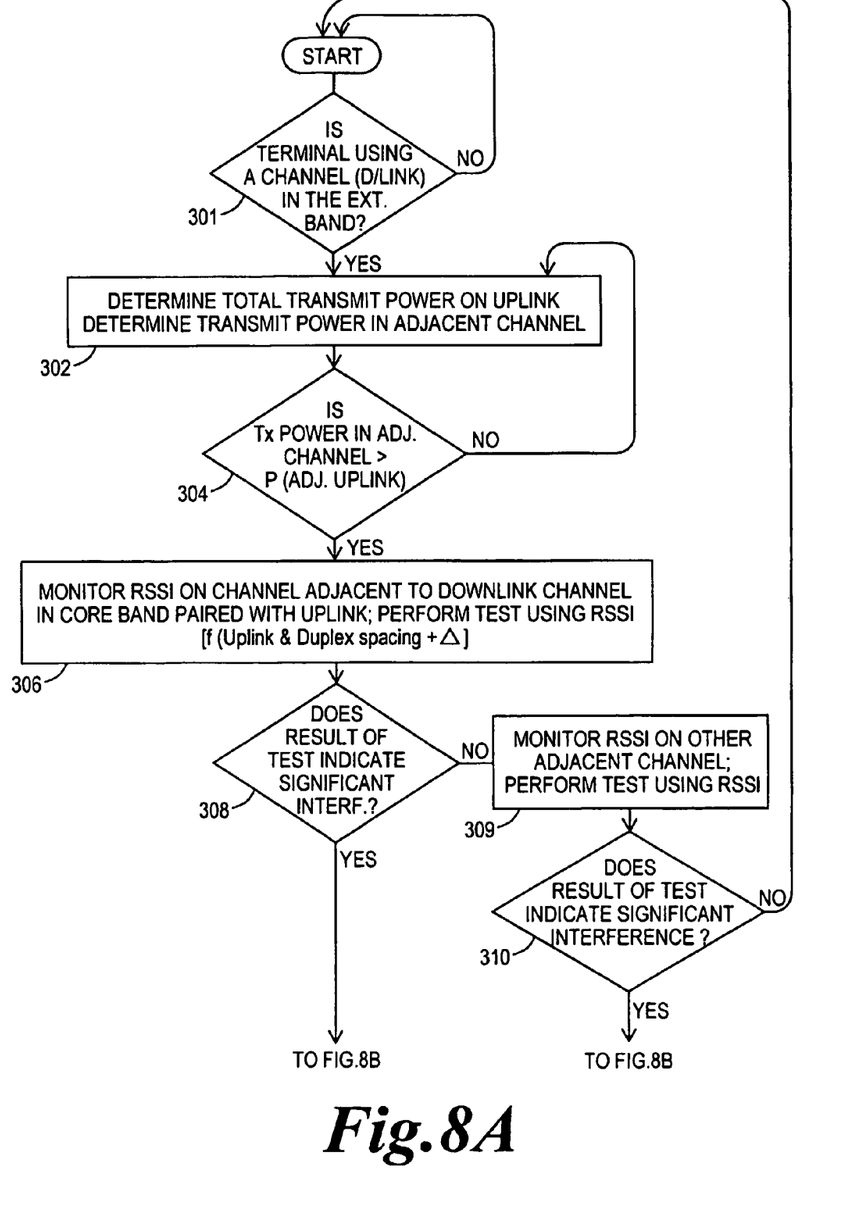
FIGS. 8A and 8B show a method performed by the terminal of FIG. 7.
Figure 8B:
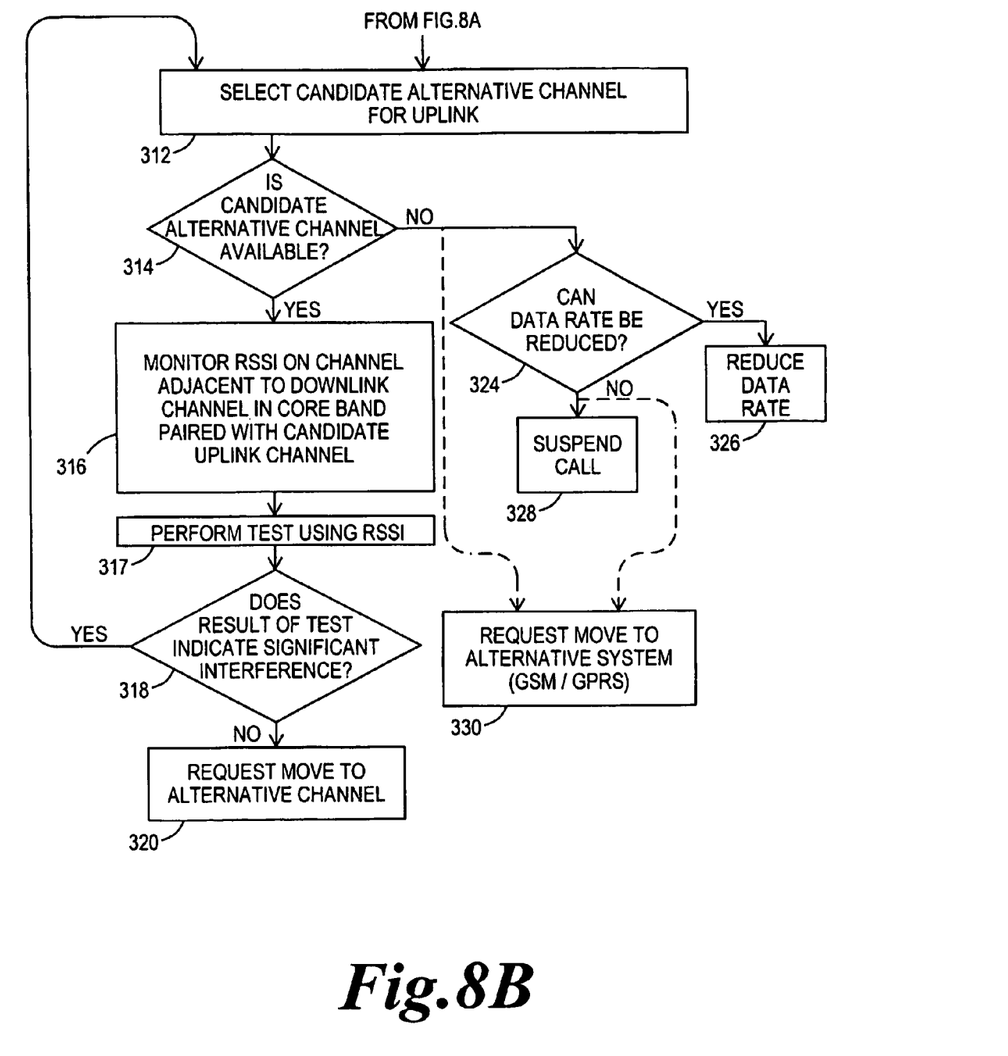

FIG. 7 shows an example of terminal equipment and FIGS. 8A, 8B show a method performed by the terminal equipment. The terminal can be a fixed or mobile terminal.

In FIG. 7 the terminal equipment comprises equipment 210 for operating within the extension band and equipment 220 for operating within the core band. The core band equipment 220 comprises a core band filter 222, a transmit chain 232-238 and a receive chain 242-249. Both bands share a common antenna 205.

The transmit chain includes a local oscillator 236 for translating the signal which is to be transmitted from an intermediate frequency to the ultimate transmit frequency, a power amplifier 234 and a full-band filter 232. The transmit chain also includes a power coupler 237 and power detector 238 for measuring the level of transmit power.

The receive chain includes a full-band filter 242, amplifier 244, local oscillator 246 and IF narrowband filter 247. The receive chain also includes a coupler 248 and receive signal strength indication (RSSI) unit 249.

Extension band equipment 210 includes an extension band filter 212, amplifier 214, local oscillator 216 and IF narrowband filter 218.

Extension band 210 and core band 220 equipment is connected to IF and baseband processing stage 250 in a manner which will be well understood by a skilled person.

A radio service manager (RSM) 260 controls operation of the terminal 200.

FIGS. 8A, 8B show a method of operating the terminal, which will be performed by the radio service manager 260. The steps of this method relate to a system where there is a core band of channels with a known, fixed, duplex spacing and an extension band containing downlink channels. Firstly, at step 301, the terminal determines whether it is using a downlink channel (from the base station to the terminal) in the extension band. The following steps of the method need only be performed if the terminal is using a downlink in the extension band.

Figure 9:
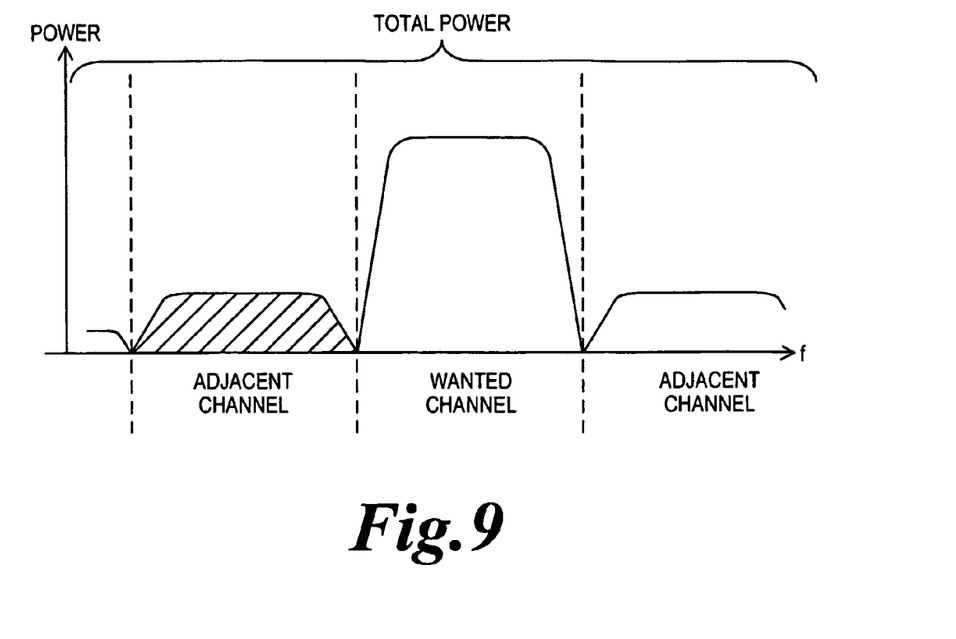
FIG. 9 shows transmitted power of a terminal.

If the terminal is using a downlink channel in the extension band, the RSM determines, at step 302, the transmit power of the terminal on the uplink using the coupler and power detector 237, 238. The power measurement derived in this way represents the total transmit power of the terminal which will, in reality, be spread across the current uplink channel and, to a much lower extent, across adjacent channels, as shown in FIG. 9. Thus, in a preferred scheme, the terminal proceeds to derive, from this total transmit power measurement, a measure of the power on an adjacent channel. This represents the amount of interfering power. The adjacent channel (interfering) power can be derived from a look-up table, direct calculation or similar means. If a look-up table is used, the table will comprise a table of values of adjacent channel (interfering) power corresponding to each value of total transmit power. The value of transmit power on an adjacent channel is compared with a threshold P(interference) at step 304. If the transmit power on an adjacent channel falls below the threshold P(interference), then the following steps do not need to be performed since the 'near-far' problem outlined above will not be serious enough. Also, if the interfering transmit power on an adjacent channel is less than the threshold, the uplink power can safely be increased without risk of interference with other users.

If the transmit power on an adjacent channel exceeds the threshold P(adjacent uplink) then the terminal could be causing interference on the uplink. However, as explained above, because the terminal is not using a downlink within the core band it does not experience interference on its own downlink and thus does not 'know' that it is causing interference on the uplink. If the transmit power exceeds the threshold P(adjacent uplink), the terminal proceeds to step 306 to monitor usage of a downlink channel which is adjacent to the one that would ordinarily be paired with the uplink channel in use by the terminal. To achieve this, the terminal tunes, using local oscillator 246, to the adjacent channel, which is located at f(uplink+duplex spacing+Δ), where the duplex spacing=190 MHz and Δ=the CDMA channel spacing=5 MHz, and measures the receive strength indication over a short duration. Referring to FIG. 6, 20 represents the position of a downlink which would ordinarily be paired with the uplink 10 and 40, 45 represent adjacent channels to the downlink 20 which would normally be paired with the uplink 10. The RSM then performs a test as to whether the terminal is causing 'significant interference' to the adjacent uplink 30. This test, which is a calculation using the measured RSSI and other quantities, is explained in more detail below. If, at step 308, the test indicates that there is a likelihood of significant interference, the RSM proceeds to step 312 to select a candidate alternative channel for the uplink.

If the result of the test, at step 308, indicates that there is not a likelihood of significant interference, then the RSM proceeds to step 309 to monitor usage of the other adjacent channel by tuning to the other adjacent channel at f(uplink+duplex spacing−Δ) and measuring the receive strength indication over a short duration. A test is made, at step 310, as to whether there is a likelihood of significant interference with this other adjacent channel. If there is not a likelihood of significant interference then the RSM can return to the start to begin the method again, preferably after a suitable wait.

If, at step 310, the test indicates that there is a likelihood of significant interference, the RSM proceeds to step 312 to select a candidate alternative channel for the uplink.

At step 312 the RSM selects a candidate alternative channel (12, FIG. 6). The RSM checks, at step 314, whether the candidate alternative channel is available for use by the terminal. If the candidate alternative channel is available then the terminal proceeds to step 316 to monitor the RSSI on a downlink channel (41, 42, FIG. 6) which is adjacent the core band downlink channel 22 that is paired with the potential new channel. At step 318 a test is made as to whether the terminal would cause significant interference with an adjacent channel.

If the terminal is unlikely to cause significant interference by using the candidate channel, the RSM initiates a handover request to the network by sending a signal to the base station in a robust manner, such as by using a transmission with a high spreading factor. If the network agrees, then the terminal moves to the new channel. Otherwise, another candidate channel is chosen at step 312.

Returning again to step 314, if a candidate alternative channel is unavailable, such as in a rural area, then the terminal may be able to reduce the data rate used on the uplink, which has the effect of increasing processing gain on the uplink at steps 324, 326. In the event that no alternative channels are available and the data rate cannot be reduced, then the terminal has the final option of suspending or dropping the call. Suspending the call is a possibility where the call is not a real time call, e.g. it is part of a data session rather than a voice connection. In the event of suspension, the user will experience a short delay. There are a number of possible ways of handling a call which has been suspended. One option is for the terminal to return to step 306 to monitor RSSI on a channel adjacent to the downlink channel in the core band paired with the uplink. The terminal can periodically measure RSSI until it falls below an acceptable level. After a period of waiting the terminal may drop the call and restart.

There is a further alternative (step 330) for terminals which support other radio systems in addition to 3G. Many 3G terminals can also operate on legacy systems such as GSM or the GSM General Packet Radio Service (GPRS). In the event that there is not a candidate alternative channel which is available at step 322, the RSM can request a move to an alternative radio system such as a 2G system like GSM or GPRS.

In the event that the terminal is unable to find or move to an alternative channel, system or operating state quickly enough, the call may be dropped.

Steps 316, 317 of monitoring RSSI on an adjacent channel and testing suitability of the candidate channel are not essential and the terminal may simply request to move to a candidate alternative channel if one is available.

In FIG. 7 the power is measured by a direct measurement of the power at point 237, following the power amplifier 234. In an alternative method, the terminal may estimate the transmit power, without measuring the actual power, by using information about the gain at which the RSM 260 has selected to operate the power amplifier 234.

Figure 10:
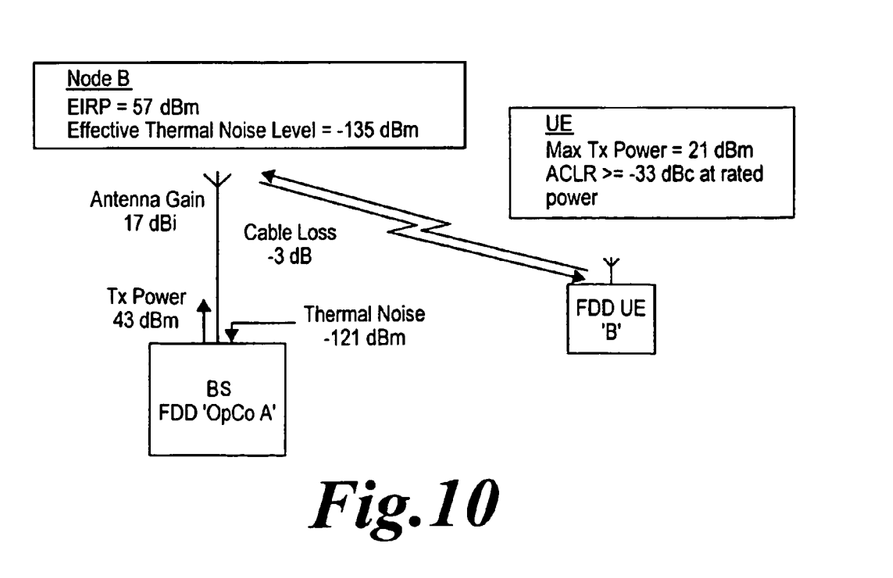
FIG. 10 shows an example wireless system.

To more fully illustrate the invention, an example system and three different example scenarios will now be investigated with reference to FIG. 10.

Example System Parameters:
Base station TX power per carrier=20 Watts (43 dBm)
Cable loss=3 dB
Base Station Antenna Gain=17 dBi
UE TX Power=21 dBm maximum
UE ACLR=33 dBc at 21 dBm, rising to 36 dBc at and below 9 dBm.
Assume infinite base station adjacent channel selectivity and ignore other effects, such as intermodulation.

A terminal UE will be taken to cause 'significant interference' to an adjacent base station BS B when the level of interference is equal to the level of thermal noise. The level of thermal noise is assumed to be −135 dBm.

The interfering power on an adjacent uplink channel is related to the total uplink power and the characteristics of the transmit chain. This can be approximated by:

$$P(\text{adjacent uplink}) = TX \text{ Power} - ACLR - \text{min. path loss} \qquad [\text{Eqn. 1}]$$

If P(adjacent uplink)>−135 dBm in the region of the base station antenna then there may be an interference problem.

If P(adjacent uplink) is high enough that it could cause a problem, RSSI on an adjacent downlink is measured.

A test for whether the adjacent channel interference is unacceptable, using the specific values given above is as follows:

$$\text{Downlink RSSI(dBm)} + \text{Uplink TX power(dBm)} - \text{ACLR(at TX power, in dBc)} > -78 \quad \text{[Eqn. 2]}$$

where:

Downlink RSSI is the measured RSSI on the downlink channel paired with the uplink adjacent to the uplink currently being used by the terminal;

Uplink TX power is the power derived from a look-up table at step 302, FIG. 8A.

Scenario 1

Minimum coupling loss between BS A and UE B is assumed to be 90 dB.

UE TX power=−20 dBm.

A terminal meeting the 3GPP requirement for ACLR of 33 dBc could not cause 'significant interference' since:

$$P(\text{adjacent uplink}) = TX \text{ Power} - ACLR - \text{minimum path loss} -$$

$$P(\text{adjacent uplink}) = 20 - 33 - 90$$

$$= -143 \, dBm.$$

Since this is below the thermal noise threshold of −135 dBm, RSSI monitoring need not occur.

Scenario 2

Downlink RSSI=−58 dBm, implying a path loss of 115 dBm between UE B and BS A.

UE B TX Power=15 dBm, ACLR at 15 dBm=35 dBc

The uplink received interference will be −20 dBm−115 dB=−135 dBm which is equal to thermal noise.

$$-58+15-35=-78 \quad \text{Checking Eqn 2:}$$

Scenario 3

RSSI=−50 dBm, implying a path loss of 107 dBm between UE B and and BS A.

UE B TX Power=8 dBm, ACLR at 8 dBm=36 dBc

The uplink received interference will be −28 dBm−107 dB=−135 dBm which is equal to thermal noise.

$$-50+8-36=-78 \quad \text{Checking Eqn 2:}$$

Figure 11:
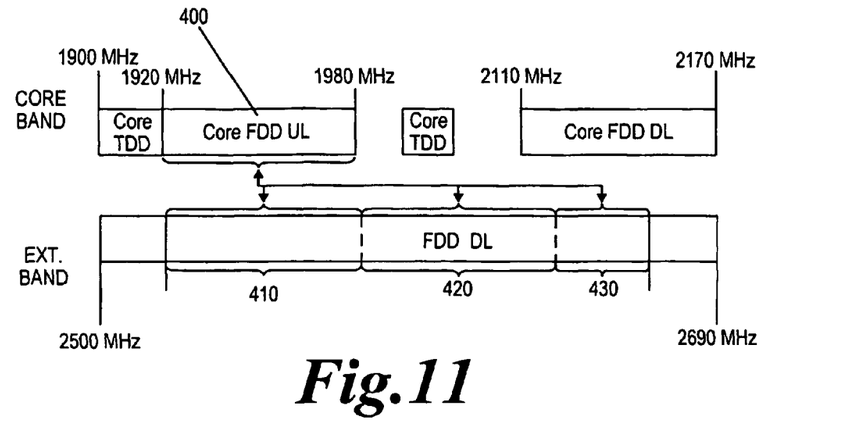
FIGS. 11 and 12 show example channel allocations in the extension band.
Figure 12:
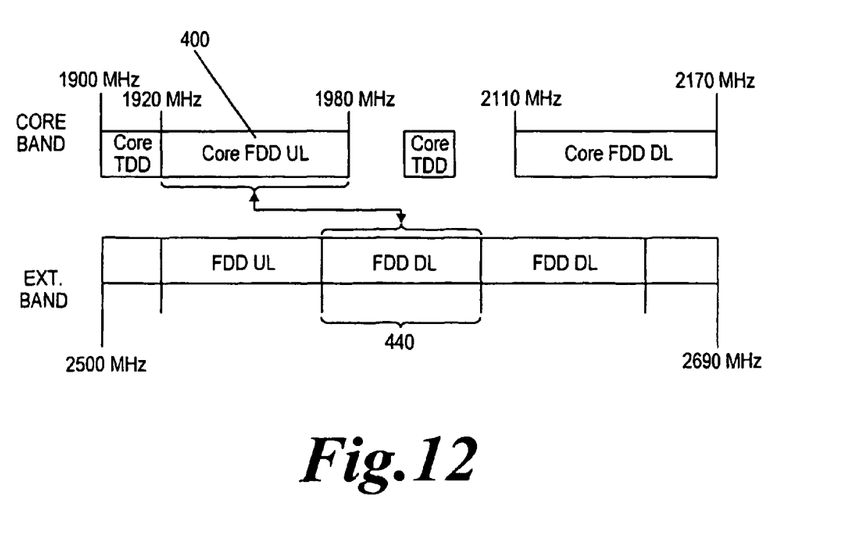

FIGS. 11 and 12 show some possible frequency allocation schemes for the extension band spectrum. In each case, downlink channels in the extension band (410, 420, 430, 440) are paired with uplink channels 400 in the core band. In FIG. 11 multiple downlink channels (410, 420, 430) in the extension band are paired with uplink channels (400) in the core band. In each of these schemes there is a possibility that the uplink and downlink channels of connections are not both adjacent one another in frequency and thus the above described 'near-far' problems cannot be detected.

Figure 13:
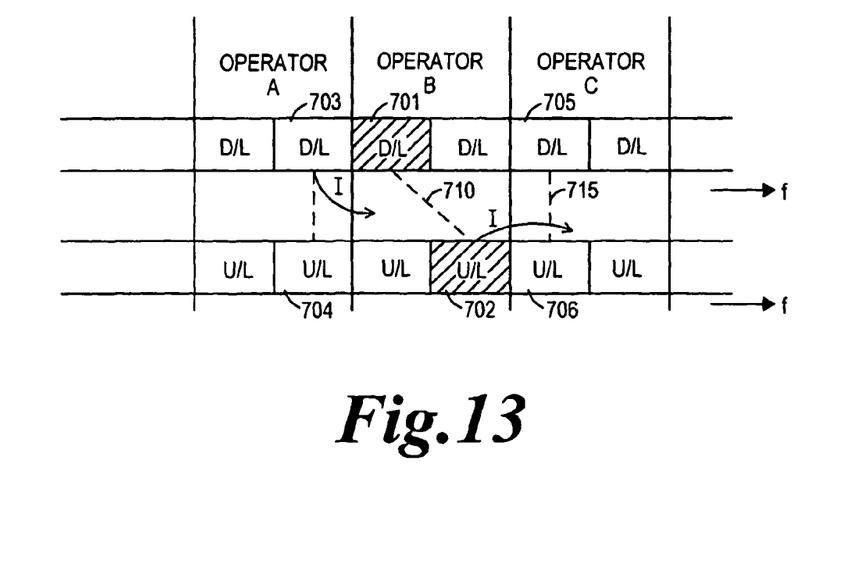
FIG. 13 shows variable duplex channel allocations.

FIG. 13 shows a similar diagram to that of FIG. 4, with a band of downlink channels and a band of uplink channels distributed among three different operators. Unlike FIG. 4, here an allocated uplink channel and downlink channel do not always have a fixed frequency duplex spacing. Downlink 701 and uplink 702 are paired together but are offset by a different frequency offset compared to other pairings, such as channels 703 and 704, 705 and 706. This irregular offset may result from uneven loading of the channels allocated to Operator B, with the allocation shown being the best or only possibility to support a connection. The irregular frequency offset gives rise to the same problem described previously. Namely, because uplink 701 and downlink 702 supporting a connection 710 do not both lie next (in terms of frequency) to an uplink and downlink supporting another connection, the terminal involved in connection 710 is not aware that it is causing interference to adjacent uplink 706. This is because the downlink 705 of connection 715 does not lie adjacent downlink 701 of connection 710.

The same technique described previously can be applied to this scenario. The terminal supporting connection 710 monitors transmit power to determine whether it is likely to cause interference. If it is, then the terminal tunes to the frequency of downlink 705 to monitor RSSI on that downlink. The RSSI measurement can be used in the same manner as before to determine whether the terminal is causing interference to connection 715 and thus whether the terminal should seek another uplink channel.

The above embodiments describe a technique for use where two adjacent channels are used for uplink transmission and the paired downlink channels are non-adjacent. The technique is equally applicable to the situation where two adjacent channels are used for downlink transmission and the paired uplink channels are non-adjacent.

The above embodiments describe a technique which is largely performed by the terminal. However, some of the steps may be performed or at least aided by the network infrastructure. As an example, the step of identifying which downlink channel is paired with an uplink channel can be performed by a base station or network controller and signalled to the terminal, with knowledge of channel allocations that have been made. Any change to different operating state of the terminal (move to a new channel, move to a lower data rate, move to a new system) requires an exchange of signalling between the terminal and network.

The invention is not limited to the embodiments described herein, which may be modified or varied without departing from the scope of the invention.

I claim:

1. A method of operating a terminal in a wireless communications system, the system having a plurality of uplink and downlink channels available for use, the terminal being arranged to use an uplink channel and a downlink channel selected from the plurality, with the uplink channel lying adjacent, in frequency, to an uplink channel used by another terminal and the downlink channel not lying adjacent, in frequency, to a downlink channel used by the other terminal, the method comprising:

transmitting a signal on the uplink channel used by the terminal, said uplink channel being an uplink channel to which a base station in communication with the other terminal does not have access;

determining whether the terminal is transmitting at a power which may cause interference to the adjacent uplink channel;

determining which downlink channel is paired with the adjacent uplink channel;

monitoring that the determined down link channel and deciding, on the basis of the monitoring, whether there is a need to operate the terminal in a manner which will reduce interference.

2. A method according to claim 1 wherein there is a first band of channels and a second band of channels available for use and the terminal can use either an uplink channel and a downlink channel from the first band or an uplink channel from the first band and a downlink channel from the second band.

3. A method according to claim 2 wherein, within the first band of channels, each uplink channel is paired with a downlink channel, with the uplink and downlink channels in each pair being separated by a known frequency offset, and wherein the step of determining which downlink channel is associated with adjacent uplink channel comprises determining a downlink channel which is offset from the adjacent uplink channel by the known frequency offset.

4. A method according to claim 3 wherein the first band of channels is a core band of channels and the second band of channels is an extension band of channels.

5. A method according to claim 1 further comprising operating the terminal in a manner which will reduce interference by selecting an alternative uplink channel for the terminal to use and transferring communication to the selected alternative uplink channel.

6. A method according to claim 5 wherein the step of selecting an alternative uplink channel comprises testing whether the alternative channel is acceptable for use.

7. A method according to claim 6 wherein the step of testing whether the alternative channel is acceptable for use comprises monitoring a metric which is indicative of usage of a downlink channel which is associated with an uplink channel that is adjacent to the alternative channel.

8. A method according to claim 1 further comprising operating the terminal in a manner which will reduce interference by selecting an alternative transmission rate for the terminal.

9. A method according to claim 1 further comprising operating the terminal in a manner which will reduce interference by selecting an alternative transmission system for the terminal.

10. A method according to claim 1 wherein the step of monitoring that downlink channel comprises monitoring a metric which is indicative of usage of that downlink channel.

11. A method according to claim 10 wherein the metric is received power.

12. A method according to claim 1 wherein the step of monitoring that downlink channel comprises determining whether the terminal is likely to cause interference to the adjacent uplink channel associated with that downlink channel.

13. A method according to claim 1 wherein, if the terminal is not transmitting at a power which may cause interference to an adjacent uplink channel, the other steps of the method are not performed.

14. A method according to claim 1 further comprising exchanging signalling information between the terminal and network to operate the terminal in a manner which will reduce interference.

15. A method according to claim 1 wherein the wireless communications system is a wideband wireless communications system.

16. A method according to claim 15 wherein the wideband communications system is a W-CDMA system.

17. A control apparatus for a terminal in a wireless communications system, the system having a plurality of uplink and downlink channels available for use, the terminal being arranged to use an uplink channel and a downlink channel selected from the plurality, with the uplink channel lying adjacent, in frequency, to an uplink channel used by another terminal and the downlink channel not lying adjacent, in frequency, to a downlink channel used by the other terminal which is in communication with a base station to which the terminal does not have access, the control apparatus comprising:
   means for determining whether the terminal is transmitting at a power which may cause interference to the adjacent uplink channel;
   means for determining which downlink channel is paired with the adjacent uplink channel;
   means for monitoring the determined downlink channel and deciding, on the basis of the monitoring, whether there is a need to operate the terminal in a manner which will reduce interference.

18. A control apparatus according to claim 17 wherein there is a first band of channels and a second band of channels available for use and the terminal can use either an uplink channel and a downlink channel from the first band or an uplink channel from the first band and a downlink channel from the second band.

19. A control apparatus according to claim 18 wherein, within the first band of channels, each uplink channel is paired with a downlink channel, with the uplink and downlink channels in each pair being separated by a known frequency offset, and wherein the means for determining which downlink channel is paired with adjacent uplink channel comprises determining a downlink channel which is offset from the adjacent uplink channel by the known frequency offset.

20. A control apparatus according to claim 19 wherein the first band of channels is a core band of channels and the second band of channels is an extension band of channels.

21. A control apparatus according to claim 17 which is arranged to operate the terminal in a manner which will reduce interference by selecting an alternative uplink channel for the terminal to use and transferring communication to the selected alternative uplink channel.

22. A control apparatus according to claim 17 which is arranged to test whether the alternative channel is acceptable for use.

23. A control apparatus according to claim 22 which is arranged to test whether the alternative channel is acceptable for use by monitoring a metric which is indicative of usage of a downlink channel which is associated with an uplink channel that is adjacent to the alternative channel.

24. A control apparatus according to claim 17 which is arranged to operate the terminal in a manner which will reduce interference by selecting an alternative transmission rate for the terminal.

25. A control apparatus according to claim 17 which is arranged to operate the terminal in a manner which will reduce interference by selecting an alternative transmission system for the terminal.

26. A control apparatus according to claim 17 which is arranged to monitor that downlink channel by monitoring a metric which is indicative of usage of that channel.

27. A control apparatus according to claim 26 wherein the metric is received power.

28. A control apparatus according to claim 17 which is arranged to exchange signalling information between the terminal and network to operate the terminal in a manner which will reduce interference.

29. A terminal for use in a wireless communications system including a control apparatus according to claim 17.

30. A wireless communications system incorporating a terminal according to claim 29.

31. A wireless communications system according to claim 30 in the form of a wideband wireless communications system.

32. A wireless communications system according to claim 31 in the form of a W-CDMA system.

33. A computer readable medium carrying software for operating a terminal in a wireless communications system, the system having a plurality of uplink and downlink channels available for use, the terminal being arranged to use an uplink channel and a downlink channel selected from the plurality, with the uplink channel lying adjacent, in frequency, to an uplink channel used by another terminal which is in communication with a base station to which the terminal does not have access and the downlink channel not lying adjacent, in frequency, to a downlink channel used by the other terminal, the software being arranged to cause a control apparatus of the terminal to perform the steps of:

determining whether the terminal is transmitting at a power which may cause interference to the adjacent uplink channel;

determining which down link channel is paired with the adjacent uplink channel;

monitoring the determined downlink channel and deciding, on the basis of the monitoring, whether there is a need to operate the terminal in a manner which will reduce interference.

\* \* \* \* \*